US006805500B2

(12) United States Patent
Miyazaki

(10) Patent No.: US 6,805,500 B2
(45) Date of Patent: Oct. 19, 2004

(54) FOCAL-PLANE SHUTTER FOR CAMERAS

(75) Inventor: Hiroshi Miyazaki, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/646,782

(22) Filed: Aug. 25, 2003

(65) Prior Publication Data

US 2004/0042787 A1 Mar. 4, 2004

(30) Foreign Application Priority Data

Aug. 27, 2002 (JP) ........................................ 2002-247429

(51) Int. Cl.[7] .......................... G03B 9/40; H04N 5/335
(52) U.S. Cl. ...................... 396/484; 396/485; 396/486; 396/487; 396/488; 348/229.1; 348/296; 348/367
(58) Field of Search ................................. 396/484, 485, 396/486, 487, 488, 489, 483, 452, 493, 456; 428/626; 348/229.1, 296, 367, 368

(56) References Cited

U.S. PATENT DOCUMENTS

| | | | | |
|---|---|---|---|---|
| 4,150,890 A | * | 4/1979 | Nakagawa et al. | ......... 396/486 |
| 6,190,060 B1 | * | 2/2001 | Tachihara et al. | ........... 396/488 |
| 6,425,698 B2 | * | 7/2002 | Nakagawa | ................... 396/484 |

FOREIGN PATENT DOCUMENTS

| | | |
|---|---|---|
| JP | 63-68827 | 3/1988 |
| JP | 7-333684 | 12/1995 |
| JP | 9-160091 | 6/1997 |

* cited by examiner

*Primary Examiner*—Rodney Fuller
*Assistant Examiner*—Rochelle Blackman
(74) *Attorney, Agent, or Firm*—Pillsbury Winthrop LLP

(57) ABSTRACT

A focal-plane shutter for cameras is constructed so that the second blade group is placed in a blade chamber on the shutter base plate side and the first blade group is placed in a blade chamber on the auxiliary base plate side. The auxiliary base plate is placed on the image sensor side in a camera and secures projecting members, each having a spherical convex portion whose surface is palladium-plated. In the first blade group, five blades are pivotally supported by two arms, and immediately before, at least, a joint shank for pivotally supporting a slit-forming blade is moved inside the aperture for exposure of the auxiliary base plate during operation and reaches a position corresponding to the edge of the aperture, the arm strikes on the projecting member and is shifted to the object side so that the head of the joint shank does not abut against the edge of the aperture. Consequently, it is avoidable that the head of the joint shank abuts against the edge of the aperture to produce wear dust.

8 Claims, 6 Drawing Sheets

FOCAL-PLANE SHUTTER FOR CAMERAS

BACKGROUND OF THE INVENTION

1. Field of the Invention

This invention relates to a focal-plane shutter for cameras which has one or two shutter blade groups, each including a plurality of arms, one end of each of which is pivotally mounted to a shutter base plate, and at least one blade pivotally supported by the arms.

2. Description of Related Art

In some focal-plane shutters used in recent years, two blade chambers are provided between three plate members, called a shutter base plate, an intermediate plate, and an auxiliary base plate, respectively, and two shutter blade groups, called a first blade (group) and a second blade (group), are separately placed in these blade chambers. Such focal-plane shutters are used in digital still cameras and silver salt film cameras as well. The focal-plane shutters used in the former cameras are known as ones in which a single shutter blade group is placed in a blade chamber provided between the shutter base plate and the auxiliary base plate.

In either type of the focal-plane shutters mentioned above, the fundamental structure of the shutter blade group is the same, and it is common practice that one or more (usually, a plurality of) blades are pivotally supported by two arms (the structure of three arms is also proposed), one end of each of which is pivotally mounted to the shutter base plate, and thereby a link mechanism of parallelogram is constructed. In the type that the two shutter blade groups are provided, a blade pivotally mounted at the foremost arm end of each shutter blade group is constructed as a slit-forming blade. The blades of the shutter blade groups relative to their respective arms have the same pivotal support structure, in which holes provided in the arms and blades are made to overlap and the tops of joint shanks which are rivet parts are inserted into the holes from the arm side and are secured to the blades by caulking work.

As a result, the joint shanks integrated with the blades and the arms are in a mutually rotatable state, but individual blades are pivotally supported by the two arms and thus only when the arms are actuated, relative rotation takes place at pivotal support portions. The caulking work mentioned above is such that each of caulking portions does not project from the sliding surface (a surface different from a surface opposite to the arm) of the blade by changing the shape of the blade, but the head of the joint shank projects from the arm. The structure of such a pivotal support portion is well known and is disclosed, for example, in Japanese Patent Kokai No. Hei 7-333684, but the auxiliary base plate is here referred to as a cover plate.

In the case of the focal-plane shutter which has two shutter blade groups, the sliding surface of each blade is directed toward the intermediate plate in the corresponding blade chamber, and thus the arms for one shutter blade group are placed on the shutter base plate side of the blades, while the arms for the other shutter blade group are placed on the auxiliary base plate side of the blades. Specifically, one shutter blade group causes all the heads of the joint shanks to project from the arms toward the shutter base plate side, while the other shutter blade group causes all the heads of the joint shanks to project from the arms toward the auxiliary base plate side.

Hence, where the shutter of this type is mounted in a camera, either one of the shutter blade groups causes the heads of the joint shanks to project toward the base plate located on the photographer side (namely the image sensor side or the film side) even though either the shutter base plate or the auxiliary base plate is located on the object side. On the other hand, in the focal-plane shutter which has only the single shutter blade group, the heads of the joint shanks can be located on the object side with respect to the camera, but a case occur in which they must be located on the photographer side because of space for incorporating the shutter in the camera.

In the shutter base plate, the intermediate plate, and the auxiliary base plate which constitute the blade chamber, apertures for exposure are provided at about their middle portions so that an exposure aperture of light from the object is determined by one or more of the apertures for exposure. Either of the focal-plane shutters described above is generally constructed so that since it is necessary to downsize the entire shutter unit, at least, the pivotal support portion at the foremost arm end is moved from the outside into the inside of the aperture and is removed from the inside to the outside of the aperture when each shutter blade group is actuated.

In the silver salt film camera as well as in the digital still camera, if dirt or dust particles adhere to the imaging surface of an image sensor or the photosensitive surface of a film, a favorable object image cannot be obtained. However, most of dirt or dust particles, usually produced in the camera, are so fine that it is difficult to see with the eye. Most of dust particles penetrating from the exterior into the camera are also fine, but sometimes contains large ones. In a conventional silver salt film camera, even when relatively large dust particles penetrate into the camera to adhere to the photosensitive surface of the film, only the frame of the film is affected, and thus little attention has been devoted to the dust particles. However, since the defect of the digital still camera to be described later has been known, special attention has frequently been devoted to this defect in recent years.

On the other hand, in the digital still camera, even though dirt or dust particles are extremely fine, attention is arrested. Specifically, when dirt or dust particles are fine, attention is not initially arrested, but they gather gradually on, and adhere to, the imaging surface and a filter placed in front thereof. In this way, the influence of the dust particles on the entire photographing image is gradually increased. Consequently, in the digital still camera, it is necessary to make some provision for any fine dirt or dust whatever. Thus, in the fabrication of the focal-plane shutter, as well as in the camera body itself, it is required to make provision for the structure as far as possible, and many proposals of such provisions have been offered.

Here, consider fine wear dust produced by the actuation of the focal-plane shutter. In the focal-plane shutter, it is generally known that extremely fine wear dust is produced from the sliding and abutting portions of the shutter in the actuation. However, it is very difficult to design the shutter so that the wear dust is not completely produced. The wear dust produced from the abutting portions is larger and more than that produced from the sliding portions. As such, it is necessary that the wear dust chiefly produced from the abutting portions is made to vanish completely or is reduced to a minimum. In this case also, it is advantageous that provision is first made with respect to a place where the wear dust is easy to reach the image sensor or the film. Therefore, it is most important to make provision in the proximity of the aperture of the base plate located on the photographer side, of the shutter base plate and the auxiliary base plate.

When the structure of the focal-plane shutter is seen from such a viewpoint, the focal-plane shutter is constructed so that the heads of the joint shanks used to pivotally support the blades with respect to the arms project from the arms toward the base plate on the photographer side in a state where the shutter is incorporated in the camera. Consequently, the most important problem is that the heads of the joint shanks moved inside the aperture during the actuation of the shutter blade group abut against the edge of the aperture of the base plate on the photographer side (the reason why this abutment is caused is well known and is also set forth in the prior art publication mentioned above) to produce the wear dust. Thus, it is conceivable that, as disclosed in Japanese Patent Kokai No. Hei 9-160091, convex portions are provided on the arm side or the base plate side so that the heads of the joint shanks do not abut against the edge of the aperture.

The arms are used in such a way that, in order to withstand a severe shock caused at the stop of an exposure operation and to achieve lightweight and high-speed design, carbon tool steel (SK4) stipulated in JIS (Japanese Industrial Standard) is heat-treated and after it is immersed in an alkaline solution to form a black oxide film, chromate treatment is applied to the steel, or after pure titanium of the second kind stipulated in JIS is nitride-treated, black painting is applied to this metal. Consequently, when the convex portions are provided on the arm side as in Kokai No, Hei 9-160091, the problem arises that the weight of the shutter blade group is increased, which becomes disadvantageous for achieving the high-speed design of the exposure operation.

As the base plate (the shutter base plate or the auxiliary base plate), to achieve the lightweight design of the entire shutter unit, aluminum or synthetic resin material softer than the arm has come into prominent use in recent years. Hence, the problem is caused that when the convex portions are provided to the base plate by punching work or simultaneous molding work, the arm made of a relatively hard, thin plate material abuts against, and slides along, the convex portions and thereby the surfaces of the convex portions are ground to produce the wear dust.

SUMMARY OF THE INVENTION

It is, therefore, an object of the present invention to provide a focal-plane shutter for cameras in which even when the heads of the joint shanks for pivotally supporting blades with respect to the arms are constructed to project from the arms toward the base plate on the photographer side in a state where the shutter is incorporated in the camera, the heads of the joint shanks moved inside the aperture during the actuation of the shutter blade group do not abut against the edge of the aperture, and even when the arms abut against, and slide along, the convex portion provided on the base plate, the wear dust is not produced.

In order to accomplish the above object, the focal-plane shutter for digital still cameras of the present invention includes two base plates provided with a blade chamber between them, each having an aperture for exposure at about the center, and a shutter blade group having a plurality of arms pivotally mounted to one of the two base plates and at least one blade pivotally supported by means of a plurality of joint shanks with respect to the plurality of arms, placed in the blade chamber so that the heads of the joint shanks project toward the photographer side. In this case, of the two base plates, the base plate placed on the photographer side has at least one convex portion metal-plated on its the object-side surface, and the arms slide along the convex portion and are shifted to the object side immediately before the heads of the joint shanks moved inside the aperture in the actuation of the shutter blade group reach a position corresponding to the edge of the aperture.

In this case, it is desirable that the surface hardness of metal plating of the convex portion is almost the same as that of each arm. In particular, the substance of the metal plating of the convex portion is palladium, and when the arm is made in such a way that after carbon tool steel is immersed in an alkaline solution to form a black oxide film, chromate treatment is applied to the steel, or titanium is nitride-treated, the optimum arm can be obtained.

In the present invention, the convex portion may be constructed as a member configured so that the object-side surface is spherical with respect to a separate member mounted to the base plate on the image sensor side. Alternatively, the base plate on the image sensor side is made of synthetic resin, and the convex portion may be constructed as a member integrally configured so that the object-side surface is spherical.

Further, the present invention may be designed so that the blade chamber provided between the two base plates is partitioned by an intermediate plate, the shutter blade group is placed between the intermediate plate and the base plate on the photographer side, and another shutter blade group pivotally supporting at least one blade by means of joint shanks with respect to a plurality of arms pivotally mounted to the one base plate is placed between the intermediate plate and the base plate on the object side.

According to the present invention, in the focal-plane shutter for cameras which is provided with at least one shutter blade group pivotally supporting at least one blade by means of the joint shanks with respect to the plurality of arms, the convex portion metal-plated is provided on the blade-chamber-side surface of the base plate placed on the photographer side, and before the joint shank for pivotally supporting the blade at top of the arm is moved inside the aperture of the base plate and reaches the edge of the aperture, the arm strikes on the convex portion so that its operation path is shifted to the object side. Thus, it is avoidable that the arm abuts against, and slides along, the convex portion to thereby produce the wear dust. Moreover, although the heads of the joint shanks for pivotally supporting the blades project from the arms toward the image sensor side, they do not abut against the edge of the aperture and hence the wear dust ceases to be produced as in a conventional shutter. Consequently, it is avoidable that the wear dust is produced immediately before the image sensor or the film and adheres thereto.

This and other objects as well as the features and advantages of the present invention will become apparent from the following detailed description when taken in conjunction with the accompanying drawings.

DETAILED DESCRIPTION OF THE PREFERRED EMBODIMENT

The embodiment provides the focal-plane shutter which can be used in either the digital still camera or the silver salt film camera, having a first blade group and a second blade group. The focal-plane shutter used in the digital still camera will be described below. As will be generally known, the first blade group and the second blade group, although different in placement, can be thought of as substantially the same structure in terms of an invention. As such, only in FIG. 3, the second blade group is schematically shown by chain lines, and in each of the other figures, the second blade group is omitted in order to facilitate a comprehension of the figure.

Figure 1:
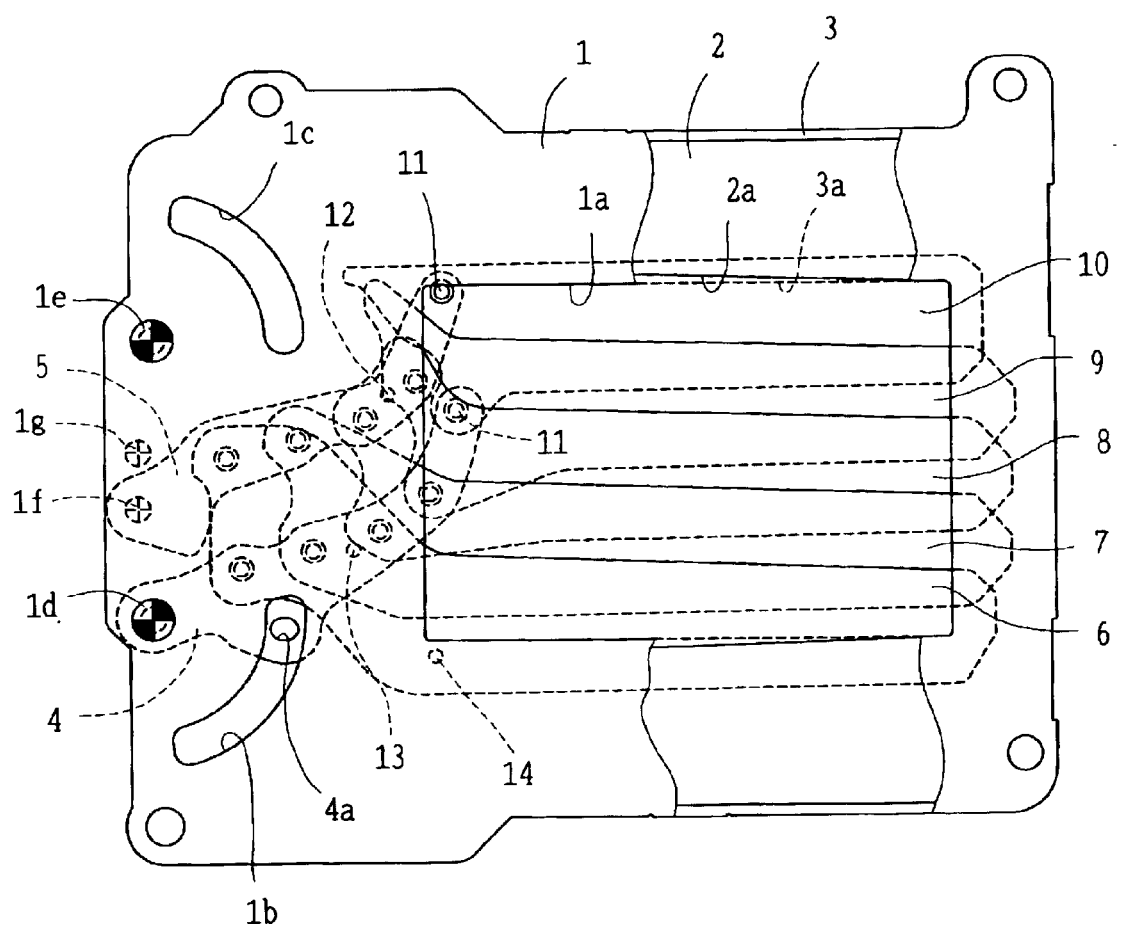
FIG. 1 is a plan view showing an embodiment of the focal-plane shutter for cameras of the present invention, viewed from the object side, in a cocking state of a first blade group.
Figure 2:
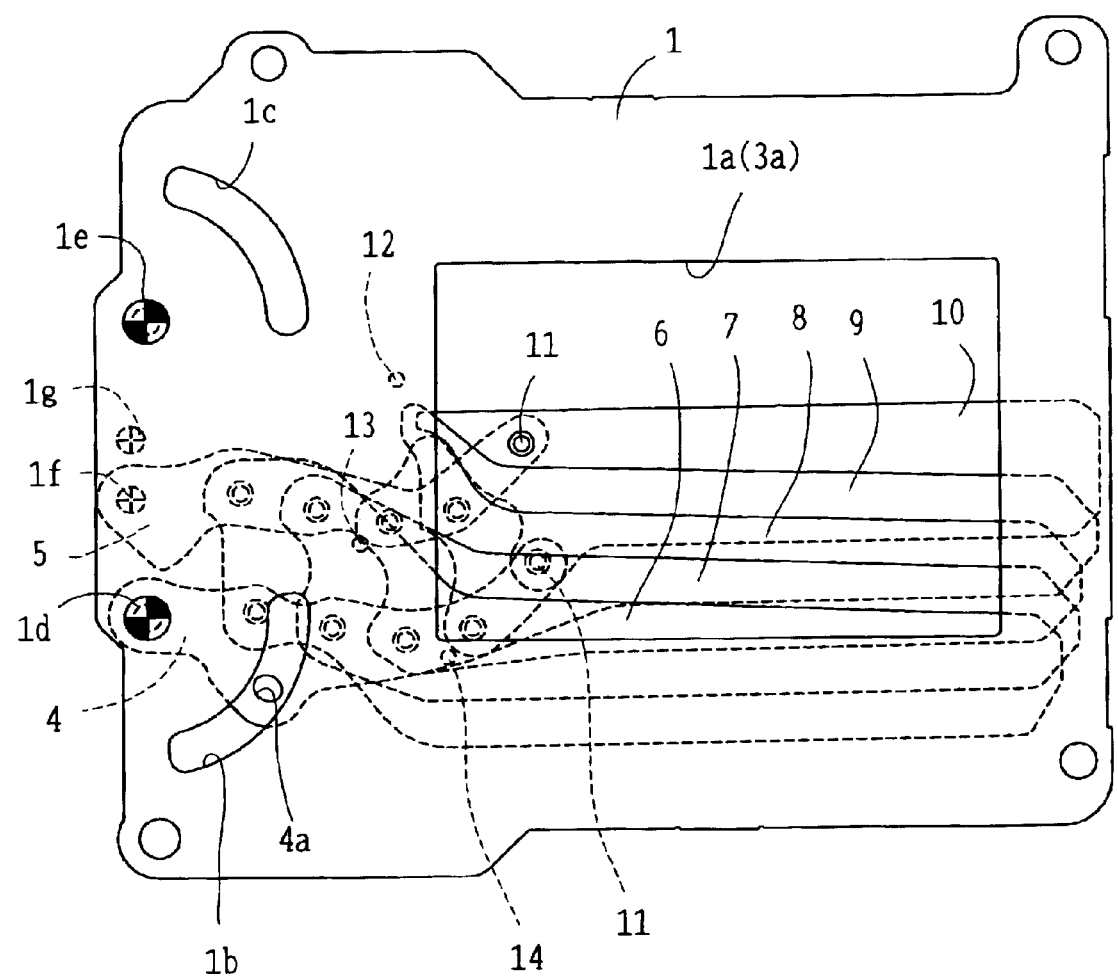
FIG. 2 is a plan view showing the embodiment, viewed in the same manner as in FIG. 1, in a state of the first half of an exposure operation of the first blade group.
Figure 3:
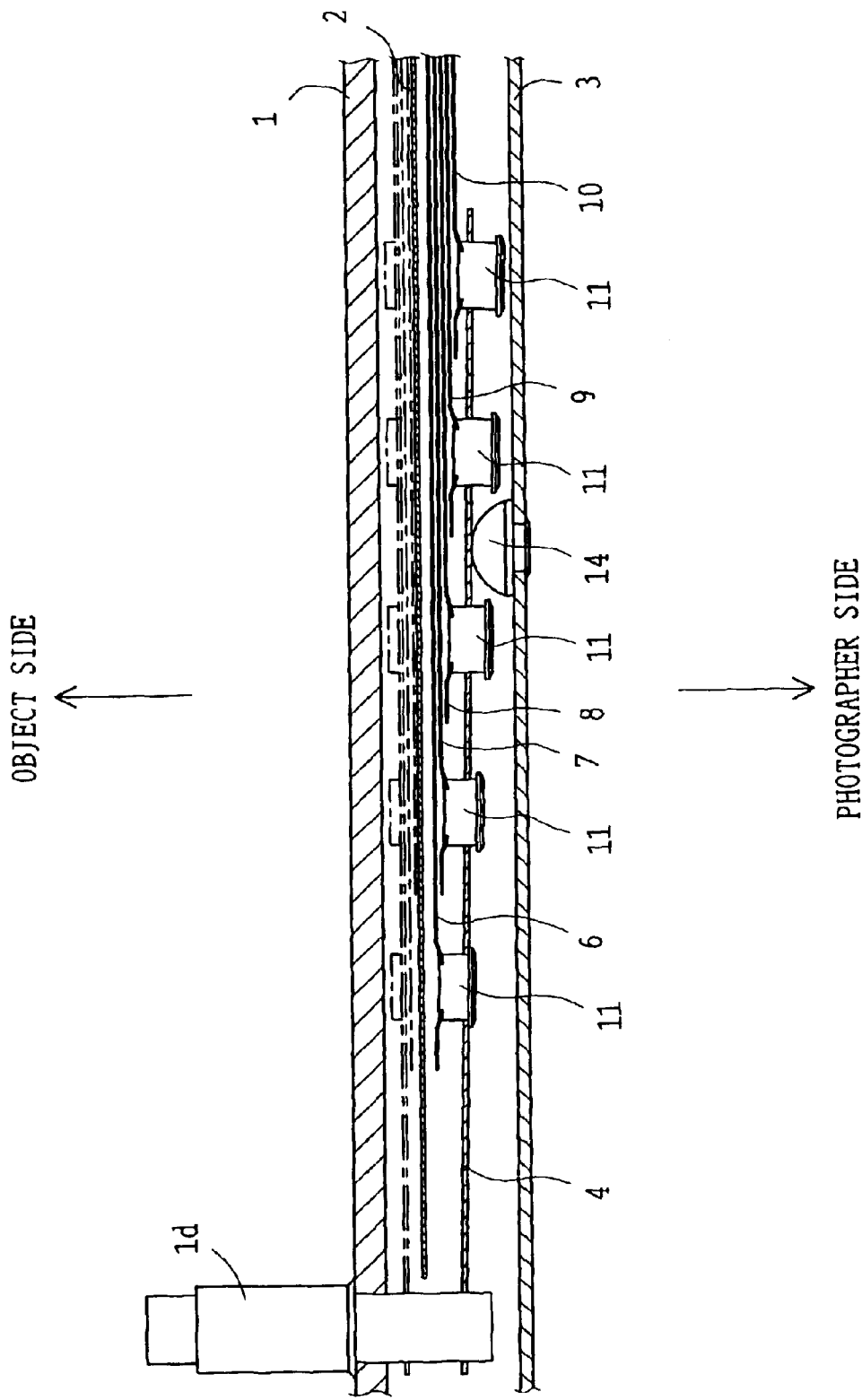
FIG. 3 is a sectional view showing essential parts of FIG. 2.

In FIG. 1, a shutter base plate 1 is provided with an aperture 1a of a sideways rectangle at about the middle. As also shown in FIG. 3, on the back surface side of the shutter base plate 1, an intermediate plate 2 and an auxiliary base plate 3 are mounted in this order with a preset space between them so that the blade chamber of the second blade group is provided between the shutter base plate 1 and the intermediate plate 2 and the blade chamber of the first blade group is provided between the intermediate plate 2 and the auxiliary base plate 3. The intermediate plate 2 and the auxiliary base plate 3 also have apertures 2a and 3a, respectively, at about the middles and these apertures are placed so as to overlap with the aperture 1a. In the embodiment, the apertures 1a and 3a have exactly the same shape to restrict the exposure aperture as a shutter unit.

Thus, in the embodiment, an image sensor, such as a CCD, is placed on the back surface side of the auxiliary base plate 3 in FIG. 1, and an imaging plane is brought to the aperture 3a. Also, when the focal-plane shutter of the embodiment is mounted in the silver salt film camera, the shutter base plate 1 cannot be located on the photographer side because an opening and closing driving mechanism mounted on the surface of the shutter base plate 1 outside the blade chamber constitutes an obstacle. However, when the shutter is used in the digital still camera, it is possible to locate the shutter base plate 1 as mentioned above. In this case, the image sensor is placed on the back surface side of the shutter base plate 1 to bring the imaging plane to the aperture 1a.

In FIG. 1, two arcuate slots 1b and 1c are provided on the left side of the aperture 1a. At the lower end of each of these slots, shock absorbing member made of rubber (which, as is well known, serves as a stopper for controlling and stopping a driving member), having a planar shape like a letter C, is usually mounted. However, such members are omitted from the figure. Shanks 1d and 1e set upright on the shutter base plate 1 are made of metal, and these shanks are force-fitted into holes provided in the shutter base plate 1 and are caulked. As shown not only on the object side, but also by broken lines in FIG. 1, or as seen from the shank 1d of FIG. 3, the shanks also have fine shank portions on the blade chamber side. In addition, shanks 1f and 1g are set upright on the blade chamber side of the shutter base plate 1.

Driving members for the first blade group and the second blade group, although not shown because of well-known members, are rotatably mounted to the shanks 1d and 1e, respectively, on the object side of the shutter base plate 1. These driving members are rotated clockwise by biasing forces of driving springs for the first blade group and the second blade group, not shown, in the exposure operation, and are rotated counterclockwise against the biasing forces of the driving springs by cocking members, not shown, in a cocking condition. The driving members for the first blade group and the second blade group are provided with driving pins, which pass through the slots 1b and 1c to project toward the blade chamber side and are connected to the first blade group and the second blade group.

The first blade group is constructed with two arms 4 and 5 and five blades 6, 7, 8, 9, and 10 which are pivotally supported in turn on the longitudinal direction of the arms, and the blade 10 pivotally mounted at the foremost end is a slit-forming blade. The arm 4 is pivotally (rotatably) mounted to the shank 1d, and the driving pin of the driving member for the first blade group, not shown, is fitted into a hole 4a. On the other hand, the arm 5 is pivotally mounted to the shank 1f.

The first blade group of the embodiment, as seen from FIG. 3, is such that the arms 4 and 5 are placed closest to the side of the auxiliary base plate 3, and in order toward the side of the intermediate plate 2, the blades 10, 9, 8, 7, and 6 are arranged. Here, reference is made to pivotal support structures of the blades 6–10 with respect to the arms 4 and 5. All the joint structures at the pivotal support portions are the same, and joint shanks 11 of identical shapes are used. Therefore, of two pivotal support portions of the slit-forming blade 10, the structure of the pivotal support portion with the arm 4 will be described as a typical example. For simplicity, in FIGS. 1, 2, and 4–6, the reference numerals of the joint shanks are used for only two joint shanks pivotally supporting the slit-forming blade 10.

The arm 4 and the blade 10 are previously provided with holes at their joint places. These holes are made to overlap, and the joint shank 11 which is a rivet part is inserted into the holes from the side of the arm 4 so that the top of the joint shank is secured to the blade 10 by caulking work. The arm 4, however, is not integrated with the joint shank 11. This is because the shank portion of the joint shank 11 has two steps as is known, for example, by Japanese Patent Kokai No. Hei 7-325334, although it may be hard to understand the reason for this from FIG. 3. Consequently, the joint shank 11 integrated with the blade 10 and the arm 4 are constructed to be mutually rotatable. As seen from FIG. 3, actually, the caulking portion is such as not to project from the sliding surface of the blade 10 (the surface of the blade 10 sliding along the blade 9), but the head of the joint shank 11 project from the arm 4 toward the side of the auxiliary base plate 3.

On the other hand, the second blade group situated between the shutter base plate 1 and the intermediate plate 2 is not shown in the figures as mentioned above, but is placed in such a way that, in FIG. 1, the first blade group is rotated from the lower to the upper portion and the figure is reversed. The second blade group is also constructed with two arms and five blades which are pivotally supported in turn in the longitudinal direction of the arms, and the blade pivotally mounted at the foremost end is the slit-forming blade. One arm is pivotally mounted to the shank 1e, and the driving pin of the driving member for the second blade group, not shown, is fitted into a hole provided in the arm. The other arm is pivotally mounted to the shank 1g. In the second blade group, the two arms are placed on the side of the shutter base plate 1 of the five blades, and the heads of the joint shanks for pivotally supporting the blades project from the arm toward the side of the shutter base plate 1.

In the embodiment, as shown in FIG. 1, three projecting members 12, 13, and 14 are mounted at different positions on the object-side surface of the auxiliary base plate 3, that is, the surface of the blade chamber side of the first blade group. The projecting members 12, 13, and 14 have the same shape and mounting way, and each of them, like the projecting member 14 shown in FIG. 3, is provided with a convex portion that the surface of the projecting member on the blade chamber side is configured into a spherical shape, and is fixed to the auxiliary base plate 3 by caulking work. In the embodiment, the auxiliary base plate 3 is made with aluminum-based material, and the projecting members 12, 13, and 14 are made of steel so that, at least, their spherical surfaces are palladium-plated. However, when the auxiliary base plate 3 is made with synthetic resin material, members corresponding to the convex portions of the projecting members 12, 13, and 14 may be configured integral with the base plate so that the surfaces of the convex portions are palladium-plated.

Subsequently, the operation of the shutter in the embodiment will be explained. FIG. 1 depicts the cocking condition of the shutter. The driving members for the first blade group and the second blade group, not shown, therefore, are held at cocking positions against the biasing forces of their driving springs. As a result, the first blade group connected to the driving member for the first blade group brings the five blades 6–10 into a spreading condition to cover the exposure aperture (the apertures 1a and 3a), while the second blade group, not shown, connected to the driving member for the second blade group brings the five blades into an overlapping condition and is housed at the upper position of the exposure aperture. In this case, since the arm 5 of the first blade group strikes on the spherical convex portion of the projecting member 12 and is pushed to the object side, the head of the joint shank 11 used for the pivotal support portion with the blade 10 overlaps partially with the auxiliary base plate 3 in FIG. 1, but does not come in contact with the blade-chamber-side surface of the auxiliary base plate 3. Since the arm 4 also strikes on the spherical convex portion of the projecting member 13, the head of the joint shank 11 used for the pivotal support portion with the blade 9 overlaps partially with the auxiliary base plate 3 in FIG. 1, but does not come in contact with the blade-chamber-side surface of the auxiliary base plate 3.

In FIG. 1, when the release button of the camera is pushed, the holding of the driving member for the first blade group is first released and after preset time, the holding of the driving member for the second blade group is released. Whereby, the five blades 6–10 of the first blade group are moved downward while overlapping, whereas the five blades of the second blade group, not shown, are moved downward while spreading, and the imaging surface of the image sensor is continuously exposed by a slit provided between the slit-forming edge (the upper edge) of the slit-forming blade 10 of the first blade group and the slit-forming edge (the lower edge, not show) of the slit-forming blade of the second blade group.

In this case, however, since each of the arms is simply rotated clockwise, with the shank to which the arm is pivotally mounted as a center, and at the same time, the top of the arm is moved inside the aperture, the arm is rotated while complicatedly vibrating the top of the arm along the optical axis. Consequently, unless some provision is made, cases arise in which, in the first blade group, when the joint shank 11 for pivotal support moved inside the exposure aperture is removed therefrom, the head of the joint shank abuts against the edge of the aperture 3a of the auxiliary base plate 3 to produce the wear dust, while in the second blade group, the head of the joint shank for pivotal support abuts against the edge of the aperture 1a of the shutter base plate 1 to produce the wear dust.

The first blade group of the embodiment, however, is designed so that when the joint shank 11 of the first blade group is removed from the exposure aperture, the head of the joint shank does not abut against the edge of the aperture 3a of the auxiliary base plate 3. Specifically, FIG. 2, in a state of the first half of the exposure operation of the first blade group, depicts the joint shank 11 connecting the arm 4 and the blade 9 just before it is removed from the exposure aperture. In this case, the arm 4, as shown in FIG. 3, already strikes on the spherical convex portion of the projecting member 14, so that the head of the joint shank 11 does not come in contact with the blade-chamber-side surface of the auxiliary base plate 3. Consequently, it is completely avoidable that the head of the joint shank abuts against the edge of the aperture 3a to produce the wear dust.

Figure 4:
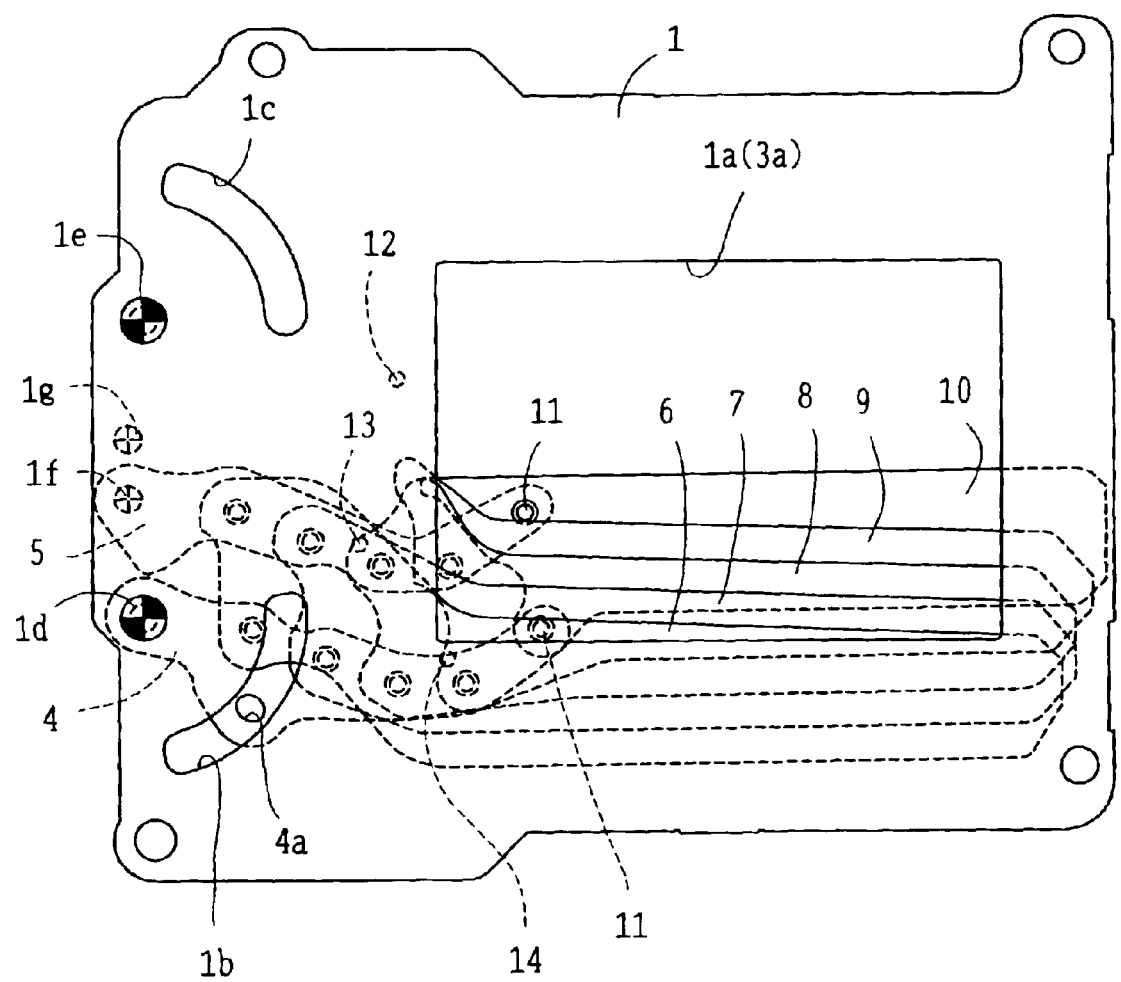
FIG. 4 is a plan view showing the embodiment, viewed in the same manner as in FIG. 1, in a state of the second half of the exposure operation of the first blade group.

Immediately after this, a state of FIG. 4 is brought about. FIG. 4 depicts a state where immediately before the joint shank 11 connecting the arm 4 and the slit-forming blade 10 is removed form the exposure aperture, the joint shank 11 connecting the arm 5 and the blade 9 is just removed from the exposure aperture. In this case, however, the arm 4 still strikes on the spherical convex portion of the projecting member 14. The arm 5 already strikes on the spherical convex portion of the projecting member 13. Hence, since the heads of both the joint shanks 11 continue to perform the operation without abutting against the blade-chamber-side surface of the auxiliary base plate 3, it is completely avoidable that the heads of the joint shanks abut against the edge of the aperture 3a to produce the wear dust.

Figure 5:
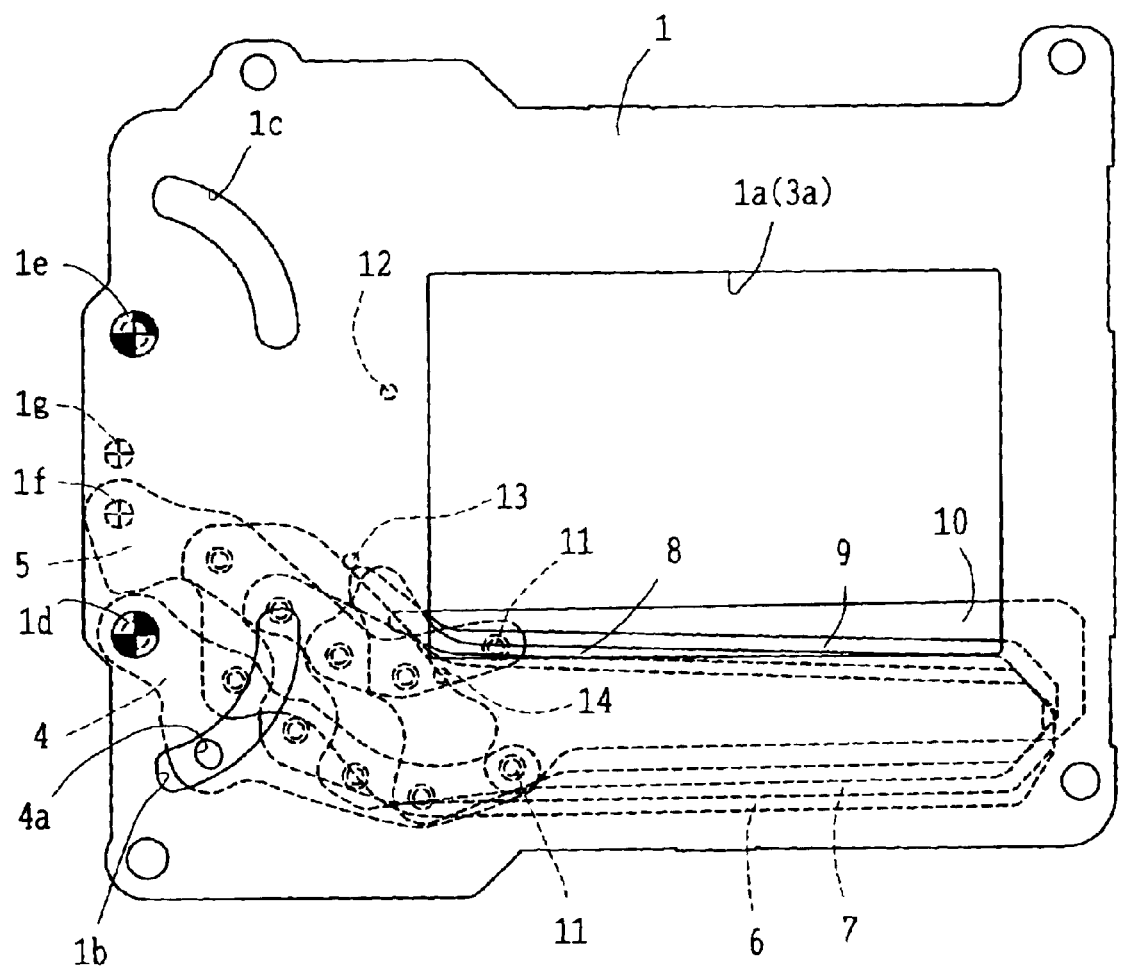
FIG. 5 is a plan view showing the embodiment, viewed in the same manner as in FIG. 1, in a state of the final stage of the exposure operation of the first blade group.
Figure 6:
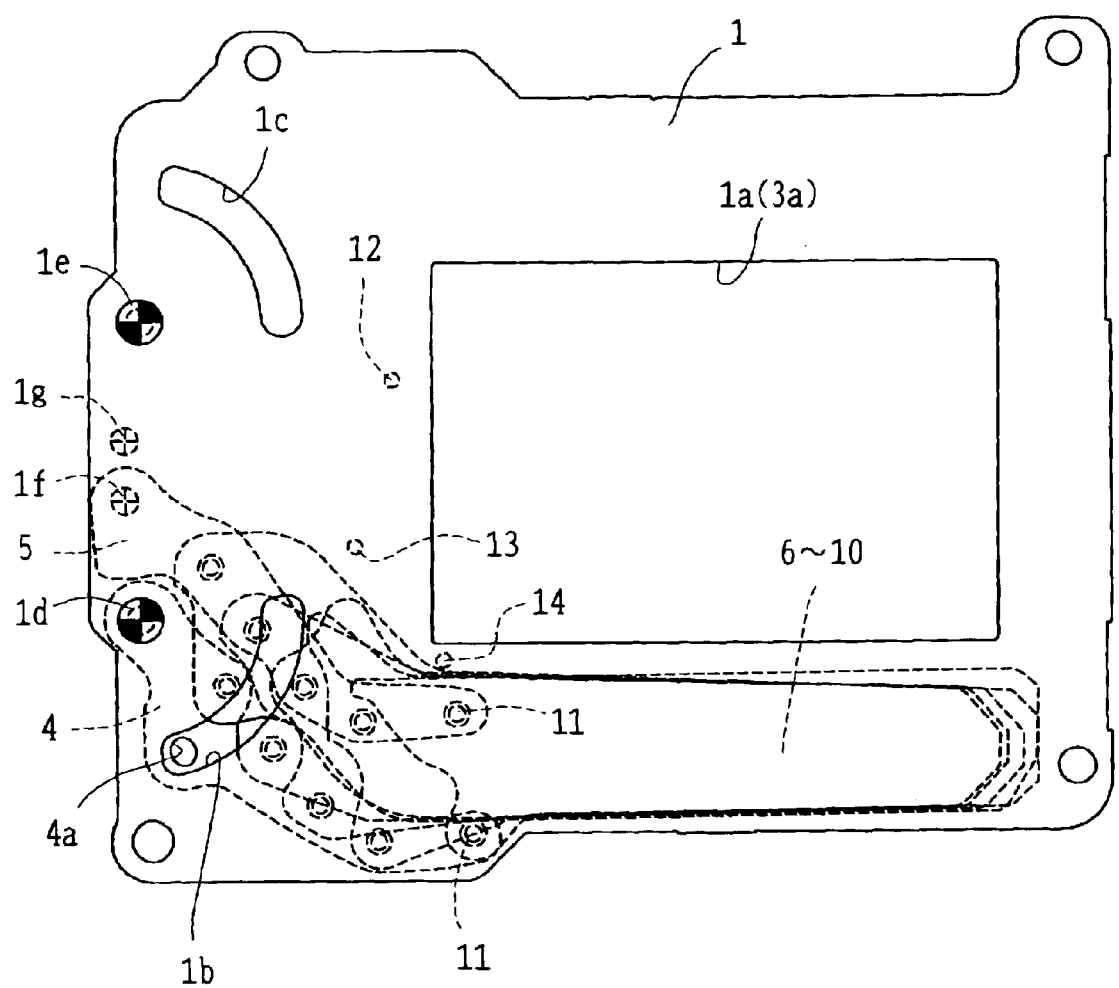
FIG. 6 is a plan view showing the embodiment, viewed in the same manner as in FIG. 1, immediately after an exposure operation of the first blade group is completed.

After that, when the arms 4 and 5 are further rotated clockwise from a state of FIG. 4, the arm 4 is separated from the projecting member 14 so that the head of the joint shank 11 of the slit-forming blade 10 slides along the blade-chamber-side surface of the auxiliary base plate 3. Instead, the arm 5 strikes on the spherical convex portion of the projecting member 13. In this process, the wear dust is not produced as in the case of the arm 4 and the projecting member 14. A state of the arm 5 strikes is shown in FIG. 5. In this case, the shutter is in a state where the joint shank 11 connecting the arm 5 and the slit-forming blade 10 is just removed from the exposure aperture, but the head of the joint shank 11, as mentioned above, can no longer come in contact with the blade-chamber-side surface of the auxiliary base plate 3. Consequently, it is completely avoidable that the head of the joint shank abuts against the edge of the aperture 3a to produce the wear dust. After that, when the driving pin abuts against the shock absorbing member, not shown, mounted to the lower end of the slot 1b, stopping the clockwise rotation of the driving member for the first blade group, the exposure operation of the first blade group is also stopped. FIG. 6 illustrates this state.

In the embodiment, as mentioned above, the heads of the joint shanks 11 do not abut against the edge of the aperture 3a, but instead, the arms 4 and 5 abut against, and slide along, the projecting members 13 and 14 during the exposure operation. In the embodiment, however, the wear dust is not produced even in this case. That is, in an ordinary case, the arms 4 and 5, as already mentioned, are used in such a way that after carbon tool steel (SK 4) heat-treated is immersed in an alkaline solution to form a black oxide film, chromate treatment is applied to the steel, or after pure titanium of the second kind is nitride-treated, black painting is applied to this metal. The surface hardness in this case is such that Vickers hardness is 500–550 Hv in the former and 500–600 Hv in the latter.

In contrast to this, the surface of the spherical convex portion of each of the projecting members 12, 13, and 14 is palladium-plated and the Vickers hardness of the surface is 450–550 Hv. Consequently, no wear dust is produced by the abutment and sliding of the arms 4 and 5. Also, if the surface hardness of the same degree is obtained, plating will not be limited to palladium and other metal plating may be used. When each of the arms 4 and 5 is made with nitride-treated titanium, there is no need to apply black painting to the surface sliding along the spherical convex portion.

On the other hand, the second blade group, not shown, as described above, starts the exposure operation behind the first blade group. Further, as mentioned above, the second blade group is situated in a state where the first blade group is reversed between the shutter base plate 1 and the intermediate plate 2, and thus the head of each joint shank projects toward the shutter base plate 1. In the second blade group, when the exposure operation is completed, the five blades are brought into a spreading condition to fully cover the exposure aperture. As such, in the second blade group, when the exposure operation is performed, there are three possible joint shanks whose heads may abut against the edge of the aperture 1a of the shutter base plate 1: the joint shank pivotally supporting the slit-forming blade with respect to the arm pivotally mounted to the shank 1g, the joint shank pivotally supporting the blade adjacent to the slit-forming blade with respect to the arm pivotally mounted to the shank 1g, and the joint shank pivotally supporting the blade adjacent to the slit-forming blade with respect to the arm pivotally mounted to the shank 1e.

The connecting relations between the arm pivotally mounted to the shank 1g and the blades are the same as those between the arm 5 and the blades 6–10 in the first blade group, and the connecting relations between the arm pivotally mounted to the shank 1f and the blades are the same as those between the arm 4 and the blades 6–10 in the first blade group. Therefore, the connecting relation between the arm pivotally mounted to the shank 1g and the slit-forming blade, as seen from the relation between the arm 5 and the slit-forming blade 10, is such that some distance is provided between the slit-forming edge of the slit-forming blade and the head of the joint shank so that the top of the arm does not protrude from the slit-forming edge. Consequently, when the heads of the above three joint shanks of the second blade group abut against the edge of the aperture 1a, the blade such as the slit-forming blade is always placed on the image sensor side of its abutment position in any case. Thus, even though the wear dust is produced by the abutment, there is no fear that the wear dust reaches directly the image sensor.

However, the production of the wear dust does much more harm than good. This is because the wear dust follows various routes under some circumstances and eventually, it may reach the image sensor. As such, in the second blade group as well, cases occur in which provision must be made so that the head of the joint shank does not abut against the edge of the aperture 1a. In such a case, it is only necessary that the projecting members corresponding to the projecting members 12, 13, and 14 are mounted at the corresponding positions of the shutter base plate 1.

In this way, when the exposure operation is completed by the first blade group and the second blade group, the cocking operation is performed by the cocking member, not shown. By the cocking member, the driving member for the first blade group mounted to the shank 1d is first rotated counterclockwise against the biasing force of the driving spring for the first blade group. The arm 4 of the first blade group in the overlapping condition in FIG. 6 is then rotated counterclockwise, and the five blades 6–10 are moved upward while reducing the amount of overlapping of adjacent blades. At this stage, the five blades of the second blade group still remain stopped and the exposure aperture is closed.

After that, when overlapping of the slit-forming blade 10 of the first blade group and the slit-forming blade of the second blade group reaches a preset amount, the cocking member, together with the driving member for the second blade group mounted to the shank 1e, is rotated counterclockwise against the basing force of the driving spring for the second blade group. As a result, the five blades of the second blade group, not shown, in the spreading condition are moved upward while increasing the amount of overlapping of adjacent blades. In this way, when the five blades 6–10 of the first blade group are brought into the condition shown in FIG. 1 and the five blades of the second blade group, not shown, are brought into the overlapping condition and are housed at the upper position of the aperture 1a, the cocking operation by the cocking member is completed. At the final stage of the cocking operation, the arms 4 and 5 of the first blade group strike on the spherical convex portions of the projecting members 13 and 12, respectively, mounted to the auxiliary base plate 3 and are shifted to the side of the intermediate plate 2. Hence, it is avoidable that the heads of the joint shanks 11 abut against the edge of the aperture 3a to produce the wear dust.

On the other hand, the heads of the joint shanks of the second blade group, not shown, also abut successively against the edge of the aperture 1a of the shutter base plate 1 at the final stage of the cocking operation. The wear dust produced by the abutment of the heads is blocked by the five blades 6–10 of the first blade group, and thus does not reach directly the image sensor.

Also, in the embodiment, the first blade group and the second blade group are constructed to move from the top toward the bottom in the exposure operation. However, it is needless to say that the present invention is also applicable to blade groups constructed to move from the bottom toward the top. In this case, it is only necessary to change the positions where the projecting members 12, 13, and 14 are mounted to the auxiliary base plate 3. Although in the embodiment the second blade group is placed between the shutter base plate 1 and the intermediate plate 2, and the first blade group is placed between the intermediate plate 2 and the auxiliary base plate 3, the present invention is also applicable to the shutter in which the first blade group is placed between the shutter base plate 1 and the intermediate plate 2, and the second blade group is placed between the intermediate plate 2 and the auxiliary base plate 3. In this case also, the positions where the projecting members 12, 13, and 14 are mounted to the auxiliary base plate 3 are changed. These mounting positions can, of course, be easily understood from the above description. In the embodiment, the three projecting members 12, 13, and 14 are provided, but if alternative provision is made, there is no need to provide all of them.

Since the digital still camera is subject to less restriction on mounting of the focal-plane shutter than the silver salt film camera, the shutter may, of course, be mounted to the camera by turning FIG. 1 upside down, and sometimes the shutter base plate 1 is mounted to the photographer side. When the shutter base plate 1 is mounted to the photographer side, it is essential that three projecting members corresponding to the projecting members 12, 13, and 14 are provided on the shutter base plate 1. In order to fabricate the shutter so that either the shutter base plate 1 or the auxiliary base plate 3 can be mounted to the photographer side, it is necessary to provide the shutter base plate 1 and the auxiliary base plate 3, each having three projecting members. By doing so, as mentioned in the operation of the embodiment, the abutment of the base plate placed on the object side (the shutter base plate 1 in the embodiment) against the edge of the aperture can be naturally eliminated.

The present invention is not limited to the construction like the embodiment that each of the projecting members is fabricated as a separate member, which is fixed to the base plate, and the spherical convex portion may be configured on the surface of the base plate. When the base plate is made of metal, the spherical convex portion may be configured by punching work. When the base plate is made of synthetic resin material, as already mentioned, the spherical convex portion may be configured by integral molding. The convex portion is not limited to the spherical shape, and any shape such that the arm strikes smoothly thereon, for example, a semicylindrical shape, is satisfactory.

The embodiment discloses the focal-plane shutter provided with two shutter blade groups, but the present invention, as already described, is also applicable to the focal-plane shutter provided with a single shutter blade group. As one structural example in this case, an aspect that the intermediate plate 2, and the second blade group and its driving mechanism, not shown, are eliminated from the embodiment is conceivable. In a normally open system, as a matter of course, a state before and during photography is shown in FIG. 6 and a state immediately after photography is shown in FIG. 1. Even when one shutter blade group or two shutter blade groups are provided, there is the case where each shutter blade group is such that only a single blade is pivotally supported by a plurality of arms. In the present invention, this single blade is the blade situated at the foremost arm end.

What is claimed is:

1. A focal-plane shutter for digital still cameras, comprising:
    two base plates provided with a blade chamber between the two base plates, each having an aperture for exposure at about a center;
    a plurality of arms pivotally mounted to one of the two base plates; and
    a shutter blade group having at least one blade pivotally supported by a plurality of joint shanks with respect to the plurality of arms, placed in the blade chamber so that heads of the joint shanks project toward a photographer side,
    wherein the plurality of arms have a surface hardness of 500–600 Hv,
    wherein, of the two base plates, a base plate placed on the photographer side has at least one convex portion on an object-side surface thereof, the convex portion being plated with metal so as to have a surface hardness of 450–500 Hv and the arms come in slide contact with the convex portion and are shifted toward the object side immediately before each of the heads of the joint shanks, which had moved from inside the aperture, has reached a position at an edge of the aperture in an actuation of the shutter blade group.

2. A focal-plane shutter for digital still cameras according to claim 1, wherein a material of metal plating of the convex portion is palladium and each of the arms is made in such a way that after carbon tool steel is immersed in an alkaline solution to form a black oxide film, chromate treatment is applied to the steel, or titanium is nitride-treated.

3. A focal-plane shutter for digital still cameras, comprising:
    two base plates provided with a blade chamber between the two base plates, each having an aperture for exposure at about a center;
    a plurality of arms pivotally mounted to one of the two base plates; and
    a shutter blade group having at least one blade pivotally supported by a plurality of joint shanks with respect to the plurality of arms, placed in the blade chamber so that heads of the joint shanks project toward a photographer side,
    wherein, of the two base plates, a base plate placed on the photographer side has at least one convex portion on an object-side surface thereof, the convex portion being plated with metal,
    wherein the arms come in slide contact with the convex portion and are shifted toward the object side immediately before each of the heads of the joint shanks, which had moved from inside the aperture, has reached a position at an edge of the aperture in an actuation of the shutter blade group,
    wherein a surface hardness of the convex portion metal-plated is substantially the same as a surface hardness of each of the arms, and
    wherein a material of metal plating of the convex portion is palladium and each of the arms is made in such a way that after carbon tool steel is immersed in an alkaline solution to form a black oxide film, chromate treatment is applied to the steel, or titanium is nitride-treated.

4. A focal-plane shutter for digital still cameras according to any one of claims 1, 2 and 3, wherein the convex portion is configured so that the object-side surface of a member mounted to the base plate placed on the photographer side is spherical.

5. A focal-plane shutter for digital still cameras according to any one of claims 1, 2 and 3, wherein the base plate on the photographer side is made of synthetic resin, and the convex portion is configured integral with the base plate made of synthetic resin so that the object-side surface is spherical.

6. A focal-plane shutter for digital still cameras according to any one of claims 1, 2 and 3 wherein space between the two base plates is partitioned by an intermediate plate, the shutter blade group is placed between the intermediate plate and the base plate placed on the photographer side, and an additional shutter blade group pivotally supporting at least one blade by means of joint shanks with respect to a plurality of arms pivotally mounted to the one base plate is placed between the intermediate plate and a remaining base plate.

7. A focal-plane shutter for digital sill cameras according to claim 4, wherein space between the two base plates is partitioned by an intermediate plate, the shutter blade group is placed between the intermediate plate and the base plate placed on the photographer side, and an additional shutter blade group pivotally supporting at least one blade by means of joint shanks with respect to a plurality of arms pivotally mounted to the one base plate is placed between the intermediate plate and a remaining base plate.

8. A focal-plane shutter for digital still cameras according to claim 5, wherein space between the two base plates is partitioned by an intermediate plate, the shutter blade group is placed between the intermediate plate and the base plate placed on the photographer side, and an additional shutter blade group pivotally supporting at least one blade by means of joint shanks with respect to a plurality of arms pivotally mounted to the one base plate is placed between the intermediate plate and a remaining base plate.

* * * * *